United States Patent [19]

Mizrah et al.

[11] Patent Number: 4,487,756
[45] Date of Patent: Dec. 11, 1984

[54] PROCESS FOR MANUFACTURING CRYSTALLINE ALUMINA

[75] Inventors: Tiberiu Mizrah, Schaffhausen, Switzerland; Bernhard Schepers, Speyer; Bernd Schröder, Cologne, both of Fed. Rep. of Germany

[73] Assignee: Swiss Aluminium Ltd., Chippis, Switzerland

[21] Appl. No.: 522,684

[22] Filed: Aug. 12, 1983

[30] Foreign Application Priority Data

Aug. 24, 1982 [CH] Switzerland ............ 5029/82

[51] Int. Cl.³ .............................................. C01F 7/02
[52] U.S. Cl. .................................... 423/625; 423/275
[58] Field of Search ................ 423/111, 625, 275

[56] References Cited

U.S. PATENT DOCUMENTS

| 2,887,361 | 5/1959 | Fenerty | 423/111 |
| 4,374,119 | 2/1983 | Schepers et al. | 423/625 |

FOREIGN PATENT DOCUMENTS

| 266780 | 11/1968 | Austria | 423/111 |
| 48691 | 3/1982 | European Pat. Off. | 423/625 |
| 1273507 | 7/1968 | Fed. Rep. of Germany | 423/625 |
| 3036279 | 4/1982 | Fed. Rep. of Germany | 423/625 |
| 742574 | 12/1955 | United Kingdom | 423/625 |
| 829602 | 3/1960 | United Kingdom | 423/625 |

*Primary Examiner*—Herbert T. Carter
*Attorney, Agent, or Firm*—Bachman and LaPointe

[57] ABSTRACT

The invention relates to a process for manufacturing crystalline alumina from aluminum hydroxide which after further conventional treatment is advantageously suitable for ceramic and refractory purposes or as a lapping and polishing agent. The process is such that aluminum hydroxide with a $Na_2O$ content of $\leq 0.1$ wt. % with respect to $Al_2O_3$ is subjected either directly or after prior partial dehydration to a thermal treatment above the temperature for transformation to $\alpha-Al_2O_3$. The aluminum hydroxide has an addition of an ammonium containing mineralizer made to it, simultaneously in the presence of boron and/or fluorine, in particular an addition of $NH_4BF_4$. The product is characterized by way of the essentially isometric shape of the single crystals.

12 Claims, 2 Drawing Figures

4,487,756

PROCESS FOR MANUFACTURING CRYSTALLINE ALUMINA

BACKGROUND OF THE INVENTION

The present invention relates to a process for manufacturing crystalline alumina, $\alpha$—$Al_2O_3$, by calcination of aluminum hydroxide, $Al(OH)_3$, up to a temperature above that for transformation to $\alpha$—$Al_2O_3$ and including addition of boron and/or fluorine containing compounds as mineralizers.

Alumina is normally produced on a large scale via the Bayer process. In that process bauxite is digested in a caustic soda solution followed by a crystallization step from which aluminum hydroxide is obtained in the form of agglomerates up to 100$\mu$ in size. The aluminum hydroxide is transformed to alumina by calcination in rotary kilns or fluidized bed type furnaces. In that process every effort is made to achieve as complete as possible conversion to $\alpha$-aluminum oxide, which takes place from about 1200° C. and with certainty at higher temperatures. The transformation to $\alpha$-aluminum oxide and crystal growth at the treatment temperature is accelerated and/or the transformation temperature lowered by the addition of small amounts of so-called calcining agents or mineralizers.

Particularly effective mineralizers in this connection are $NaF$, $CaF_2$, $AlF_3$, $Na_3AlF_6$ and $x(BF_4)_n$, where x stands for metallic elements, in particular elements with a valency of 1 or 2 and n is balancing factor taking into account the valency of x. According to the German patent DE-AS No. 11 59 418 a few tenths of a percent of hydrogen fluoride gas in the furnace atmosphere has the same effect.

The alumina produced this way is always such that the individual particles are plate-shaped with the largest dimension perpendicular to the c-axis.

Depending on the rate of throughput or rate of heating-up and the type and amount of the fluorine compound, the temperature of transformation to $\alpha$-aluminum oxide and its crystal size and shape can be varied within a limited range. Up to now, however, it has not been possible to produce isometric $\alpha$-alumina (corundum) crystals this way.

By isometric, and the frequently used synonyms equi-axed, cubic, spherical, polyhedral etc. $Al_2O_3$ crystals is to be understood crystals which have a ratio of diameter D perpendicular to the crystallographic c-axis and height H parallel to the c-axis close to the value 1.

For many applications in the industries processing calcined aluminum oxide there is a need to overcome the disadvantages of this raw material, caused by the normally pronounced plate-shaped character of the $\alpha$-aluminum oxide, by altering its properties such that they are closer to those of an isometric material.

In the preparation of surfaces, in particular when polishing soft or brittle materials such as polymers, non-ferrous and noble metals, glass and semi-conductor materials, every effort is frequently required to avoid any damage which penetrates below the surface, such as can be created by sharp-edged thin platelet-shaped crystals of the preparation material. Another disadvantage of such crystals with large diameter to height ratio D/H is that when employed as a rubbing compound, especially for lapping and polishing, the crystals break easily and form cutting edges of random geometry. The intended advantage of the single crystal grains with constant cutting geometry on all crystals due to the natural morphology and high incidence of specific cutting edges is thus to some extent lost.

For the above reasons alumina products made via the calcination of aluminum hydroxide have up to now been unable to find application in certain areas of surface treatment technology e.g. some applications in the field of optics.

In the U.S. Pat. No. 4,193,768 a process for manufacturing corundum crystals is proposed. That proposal is such that fine nuclei of corundum crystals are mixed with an initial aluminum oxide hydrate and, in order to precipitate corundum on the fine corundum nuclei, the resultant mixture is subjected to a hydrothermal treatment until the fine corundum particles have grown to the desired size. This process does indeed produce good crystals for the above mentioned purposes, but is very involved and therefore uneconomical.

SUMMARY OF THE INVENTION

The object of the present invention is therefore to produce an advantageous aluminum oxide which in particular is economically attractive to manufacture, is such that at least 80% of its crystals have a diameter to height ratio D/H of at most 2, preferably 1, and should comprise primary crystals measuring 1-10 $\mu$m, preferably 3-8 $\mu$m.

This object is achieved by way of the present invention. The process of the present invention is a process for manufacturing crystalline alumina, $\alpha$—$Al_2O_3$, by calcination of aluminum hydroxide, $Al(OH)_3$, up to a temperature above that required for the transformation to $\alpha$—$Al_2O_3$ in the presence of an addition of mineralizers in the form of boron and/or fluorine containing compounds, in which, the aluminum hydroxide features a $Na_2O$ concentration of $\leq 0.1$ wt.%, preferably 0.05 wt.%, with respect to $Al_2O_3$, and has added to it a mineralizer containing ammonium ($NH_4^+$).

The product is characterized by way of the essentially isometric morphology of the single crystals and differs from aluminum oxides produced by comparable processes in particular in its morphology by the occurrance of the rhombohedral form.

BRIEF DESCRIPTION OF THE DRAWINGS

Further advantages, features and details of the invention are revealed in the following description of exemplified embodiments of the invention and with the help of the drawings wherein.

DETAILED DESCRIPTION

Figure 1:
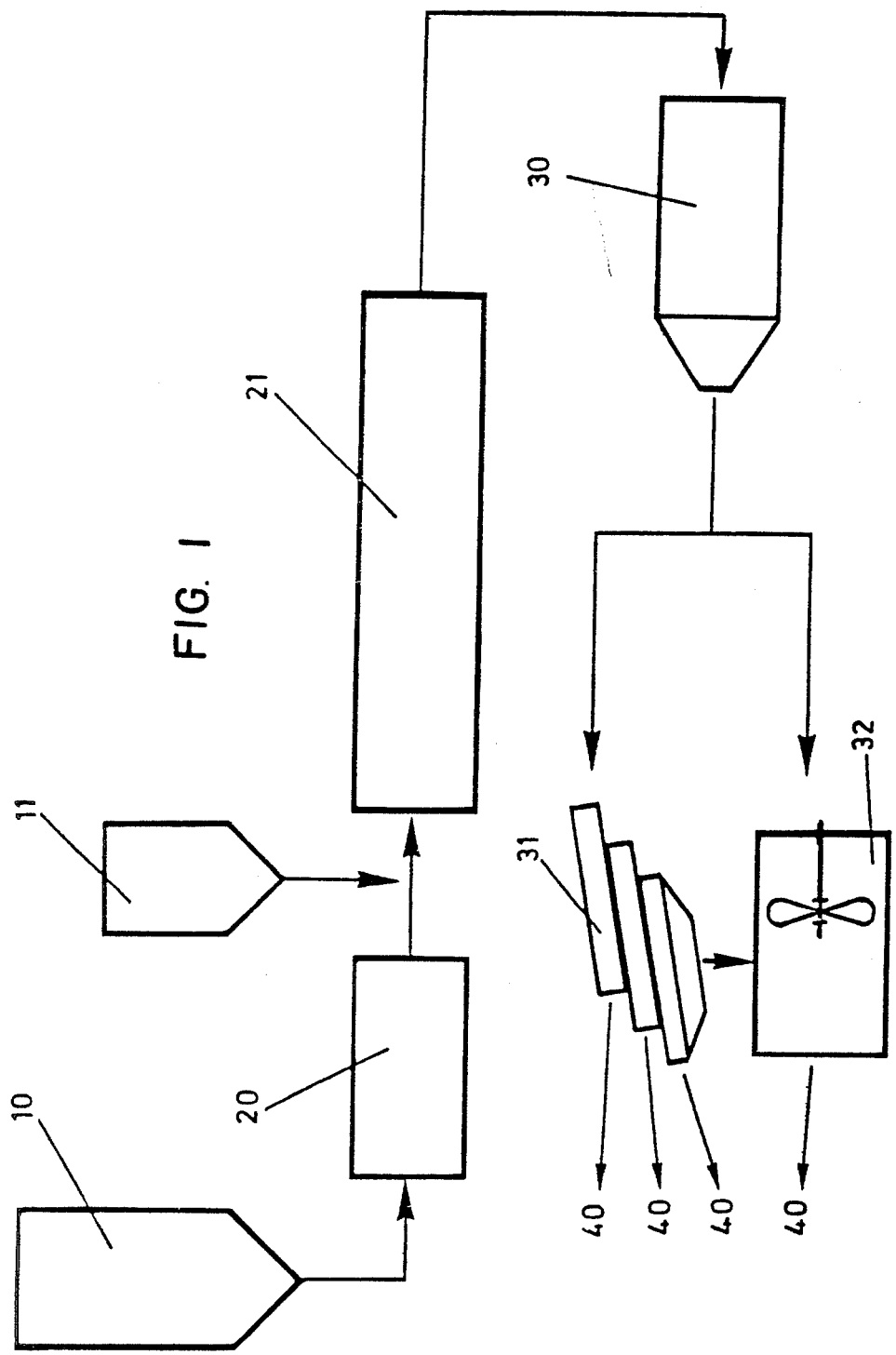
FIG. 1 shows schematically the sequence of steps in the process of the invention and an example of further processing of the product.

The process can be carried out in one or two stages. In the latter case the addition of the mineralizer can be made by mixing with the pre-dried product of the first stage, or directly into the furnace in the second stage. If the addition is made directly into the furnace this can be made counterflow and/or simultaneous flow i.e. by employing a rotary kiln on the side where the product from the first stage is fed in and/or at the burner.

Aluminum oxide with a $Na_2O$ concentration of 0.1% with respect to $Al_2O_3$ is situated in silo 10, the mineralizer substances in silo 11. In the two-stage process the hydroxide is passed through a drier 20 where it releases most of its water of crystallization. The intermediate product leaving the drier passes into furnace 21 together with the mineralizer. The product from furnace 21 comprises agglomerated corundum with the crystal morphology described above. The agglomerated particles are freed from the agglomerated state and divided up into various single crystal fractions 40 according to size by conventional methods such as e.g. grinding 30, sieving 31 and air-borne separation 32.

The temperature for dehydration in the drier 20 is not very critical. However it should be above approximately 200° C. and, if possible, not exceed 550° C., otherwise a significant restructuring of the product starts to take place. The most favorable temperature range lies approximately between 250° and 500° C. The most favorable time for passage of the aluminum hydroxide through the drier is about 3.5 hours at 250° C. and about 1 hour at 500° C.

The addition of the mineralizer to the intermediate product leaving the drier 20 can be made discontinuously, for example, such that the specific amount of mineralizer is intensively mixed-in with the appropriate amount of intermediate product in a mixer, or continuously fed in weighed amounts to the intermediate product which goes into the furnace. The last mentioned procedure did not lead to any reduction in quality.

On the other hand it is not advantageous to lower the temperature of the intermediate product greatly, or to hold the intermediate product in store and allow it to cool completely to room temperature. In such cases one often finds milky, cloudy crystals in the final product.

The furnace 21 does not have to meet any special requirements with respect to type or size. Usefully a rotary kiln is employed and operated in such a way that the maximum temperature at the burner is at most about 1400° C. and at the entrance a maximum temperature of about 700° C. The length of the furnace and/or the speed of rotation should be dimensioned such that the material passes through the furnace in about 1.5 to 4.5 hours.

If the mineralizer is added directly i.e. in a single stage operation of the process, adequate mixing with the intermediate product from the drier 20 takes place in the first meter of entering the furnace; in such a case it has been found that the end product was always homogeneous.

As already mentioned above, the mineralizer is also effective if it is added along with the aluminum hydroxide to the drier 20 and then passes through the calcining furnace 21. This mode of operation would correspond to the conventional process employing a single heating facility, but with the difference that the region in which a significant water vapor atmosphere is produced is markedly reduced by employing the drier.

Various trials employing aluminum hydroxide with 0.1–0.03% $Na_2O$ (with respect to $Al_2O_3$) and employing ammonium ($NH_4$) containing mineralizer substances led to the production of $\alpha$—$Al_2O_3$ (corundum) crystals measuring 1–10 $\mu m$ in size with the greater part in the 3–8 $\mu m$ range. The crystals were essentially isometric and were very similar to that shown in FIG. 5.8d in "Crystal Growth from High Temperature Solutions" by Elwell and Schell, 1975, page 219.

All trials were carried out using a rotary kiln 6.5 m long and inner diameter of 60 cm.

In each of the examples 1–5 set out in the table below 300 kg of starting material was taken and charged at a rate of approximately 40 kg per hour. In example No. 1 the material was fed directly to the rotary kiln, in examples 2–5 via the drier, the dwell time in the drier being about 1 h, in the rotary kiln between approximately 2.5 and 4.5 h. In example No. 1 the dwell time was about 3 hours.

EXAMPLES

| Trial | Calcination | $Na_2O$ conc. in $Al(OH)_3$ (as wt. % of $Al_2O_3$) | Mineralizer Compound | wt. % | Mixing of Mineralizer with $Al(OH)_3$ | Temperature in drier (°C.) | Maximum temp. (°C.) | Dwell Time in 2nd stage (hours) | Product Size of 80% of crystals ($\mu m$) | D/H $\leqq$ |
|---|---|---|---|---|---|---|---|---|---|---|
| 1 | single stage | 0.1 | $NH_4BF_4$ | 0.1 | after drying $Al(OH)_3$ at 130° C. | — | 1200 | 2.5 | 2–4 | 1.5–2 |
| 2 | two stage | 0.1 | $NH_4Cl$ $NH_4BF_4$ | 0.03 0.03 | after drier | 400 | 1200 | 4.5 | 1–4 | 1–2 |
| 3 | two stage | 0.05 | $NH_4BF_4$ | 1.0 | before drier | 400 | 1400 | 3.5 | 8–10 | 1–1.5 |
| 4 | two stage | 0.1 | $NH_4F$ $B_2O_3$ | 0.075 0.075 | after drier | 200 | 1200 | 2.5 | 3–5 | 1.5–2 |
| 5 | two stage | 0.1 | $NH_4BF_4$ | 0.1 | after drier | 200 | 1350 | 3.5 | 4–6 | 1–1.5 |

The crystals are suitable for lapping and polishing purposes and for use in the ceramics industry. The density (according to the German standard DIN No. 53194) of the product from trial 5, after breaking down the agglomerated particles in a laboratory vibratory mill and compacting, was 2.200 kg/m$^3$. This value is about 40% higher than that of a commercially available alumina product of comparable crystallite size.

Figure 2:
FIG. 2 shows the rhombohedral crystals of the present invention at a magnification of 6000$\times$.

In all trials the calcined end product was shown via x-ray investigations to be, as expected, almost exclusively made up of corundum, $\alpha$—$Al_2O_3$. The $\beta$—$Al_2O_3$ line 200 (CuK, d = 11.3 Å) was faint and only just visible in all samples. Otherwise the crystals exhibited no inhomogeneity. The $\alpha$—$Al_2O_3$ diffraction lines were all sharp, which is interpreted as a sign of defect-free crystals. FIG. 2 shows a sample from trial No. 2 at a magnification of 6,000 times.

In the industries processing aluminum oxide viz. the ceramic and in particular oxy-ceramic industries and in the manufacture of refractory products there is a general demand for materials which can be compacted as densely as possible. The product manufactured by the process according to the invention is exceptionally well suited for this field.

What is claimed is:

1. Process for manufacturing crystalline alumina $\alpha$—$Al_2O_3$ from aluminum hydroxide including a $Na_2O$ concentration of $\leqq 0.1$ wt.% with respect to $Al_2O_3$, adding to the aluminum hydroxide a mineralizer selected from the group consisting of boron-containing compounds, fluorine-containing compounds and mixtures thereof, wherein said mineralizer has added to it a mineralizer containing ammonium, and calcining said aluminum hydroxide at a temperature from 700° C. up to a temperature above that required for the transformation to $\alpha-Al_2O_3$ in the presence of said mineralizers to produce said alumina wherein at least 80% of the crystals are 1-10 μm in size and exhibit at most a diameter to height ratio D/H of 2.

2. Process according to claim 1 wherein said aluminum hydroxide includes a $Na_2O$ concentration of equal to or less than 0.05 wt.%.

3. Process for manufacturing crystalline alumina according to claim 1 wherein at least one of the boron and fluorine containing compounds contains ammonium.

4. Process for manufacturing crystalline alumina according to claim 3 wherein the boron and fluorine containing compound is $NH_4BF_4$.

5. Process for manufacturing crystalline alumina according to claim 1 wherein the aluminum hydroxide is pre-dried in a first stage and is subjected to the calcination treatment in a second stage after the addition of the mineralizer.

6. Process for manufacturing crystalline alumina according to claim 5 wherein the first stage is carried out in a temperature range of $\geq 200°-550°$ C.

7. Process for manufacturing crystalline alumina according to claim 6 wherein the first stage is carried out in a temperature range of 400°-550° C.

8. Process for manufacturing crystalline alumina according to claim 5 wherein the calcination treatment time in the second stage of the process is about 1.5-4.5 hours.

9. Process according to claim 1 wherein said calcining step is at a temperature of from about 700° to 1400° C.

10. Process according to claim 1 wherein the aluminum hydroxide is pre-dried in a first stage, the mineralizer is added to the drier along with the aluminum hydroxide and the dried aluminum hydroxide with mineralizer is subjected to the calcination treatment in a second stage.

11. Process according to claim 1 wherein said aluminum hydroxide includes a $Na_2O$ concentration of 0.1-0.03% with respect to $Al_2O_3$.

12. Process according to claim 1 wherein said boron and fluorine-containing mineralizers are selected from the group consisting of $NaF$, $CaF_2$, $AlF_3$, $Na_3AlF_6$ and $x(BF_4)_n$, wherein x stands for metallic elements with a valence of 1 or 2 and n is the valence of x.

* * * * *